Sept. 23, 1969  SHIRO YAMATE ET AL  3,468,178
INTERLOCKING ARRANGEMENT FOR ROTATING SHAFTS
Filed Oct. 23, 1967  2 Sheets-Sheet 1

INVENTORS
SHIRO YAMATE
NOBORU ARAIKAWA

United States Patent Office 3,468,178
Patented Sept. 23, 1969

3,468,178
INTERLOCKING ARRANGEMENT FOR ROTATING SHAFTS
Shiro Yamate and Noboru Araikawa, Nagasaki-shi, Japan, assignors to Mitsubishi Jukogyo Kabushiki Kaisha, Tokyo, Japan
Filed Oct. 23, 1967, Ser. No. 677,115
Claims priority, application Japan, Oct. 26, 1966, 41/70,255
Int. Cl. F16h 3/38
U.S. Cl. 74—339          5 Claims

ABSTRACT OF THE DISCLOSURE

An apparatus for synchronizing a second shaft with a continuously rotating first shaft while the first shaft is rotating includes a first synchronizing shaft which is driven by the first shaft through gearing and a second synchronizing shaft which is geared to the second shaft and which may be connecting for driving by the first synchronizing shaft through a clutch defined between the ends of the first and second synchronizing shafts. The gearing between the first shaft and the first synchronizing shaft and between the second synchronizing shaft and the second shaft is such that the second shaft is driven at a speed slightly different from the first shaft when the clutch between the two synchronizing shafts is engaged. The mechanism includes means for automatically engaging the clutch elements between the two synchronizing shafts and maintaining the clutch element under pressure contacting engagement and, after the second shaft is driven by the clutching arrangement at a speed which varies from the speed of the first shaft by 5 r.p.m., for example, coupling of the first and second shafts together. The slight difference of rotational speeds of the first and second shafts permits the interengagement of a claw coupling to connect the shafts together for direct driving and when this is accomplished pressure is removed from the clutch elements driving between from the first synchronizing shaft to the second synchronizing shaft.

Summary of the invention

Figure 1:
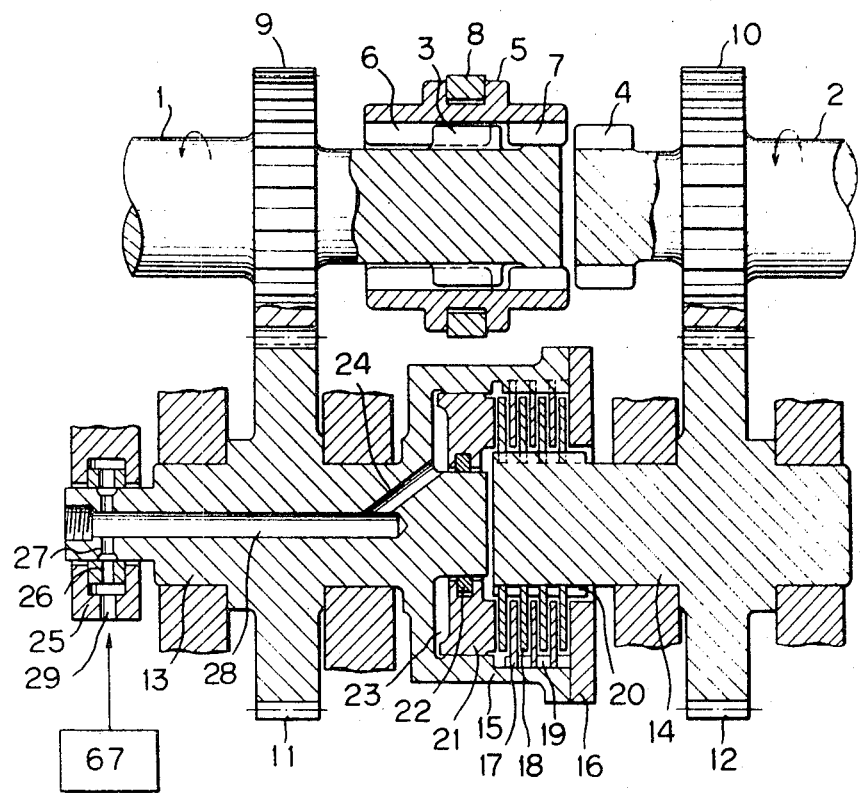

Keeping pace with the recent requirements for prime movers of higher outputs and greater efficiencies than before, there is noted a growing tendency that, for example in power generation plants and power plants for marine vessels, the main prime movers are operatively coupled direct to the generators or auxiliary motors for feed pumps for boilers by means of interlocking arrangements incorporating shaft couplings for connecting or disconnecting the units in power transmission relationship, so that improved operational economy can be achieved.

Therefore, each shaft coupling to be interposed between two mechanical units for joint rotation with a high output and high speed should meet various requirements. It must involve the least possible power loss which can impair an economical operation of the particular plant, must be capable of high-output and high-speed power transmission, and must operate safely, positively and dependably, and further it must be limited in volume and available at low cost. Of shaft couplings (or clutches) of known types, for example fluid couplings have drawbacks in that they invite power loss and are not adapted for high-speed power transmission and, moreover, they require relatively large spaces and much expenses. Electromagnetic and friction clutches are both not suitable for high driving torque power transmission. In addition, electromagnetic clutches involve power loss and requires large spaces and expenses. While claw couplings are free from the foregoing shortcomings, they have a disadvantage in that their claw interlocking motion becomes unsmooth and non-positive during high-speed running. More specifically, if the difference in speed between the coupling member on one driving side and that on the opposite driving side is too great, the two coupling members cannot readily come into engagement with each other. If engaged somehow or other, the two rotating bodies are suddenly and forcibly urged to run in the same directions with the result that both are subjected to a serious impact which may be destructive enough to damage not only the claw coupling but the rotating units themselves.

With this in view, means have generally been adapted which imparts relative speed changes to opposing coupling members and detects the moment at which the running speed of one coupling member just exceeds that of the opposite coupling member so as to bring the two coupling members into engagement with each other. This means still has a drawback in that difficulties are encountered in effecting the engagement with a desired relative speed difference because of an operational time lag between the moment of detection of the optimum speed relationship and the moment of actual engagement of the coupling members. To carry out the speed detection automatically, synchro-self-shifting clutch, synchronizing tooth clutch, etc. have been designed. However, they are limited in applications because the running prime movers are thereby subjected to unexpected load disturbances and those clutches have not been employed in high-output transmission system in the light of the relationship between the speed variations normally encountered in practical use and the permissible stretch for service.

The present invention provides an interlocking arrangement comprising a claw coupling for connecting and disconnecting first and second shafts and synchronizing shafts which are driven by the first shaft and rotationally drive the second shaft by way of a friction clutch up to a speed close to that of the first shaft, so that the first and second shafts can be coupled by the claw coupling when the running speeds of the two shafts are made almost equal by means of the synchronizing shafts and the friction clutch. The invention has for its object provision of an interlocking arrangement for rotating shafts which involves only limited power loss during transmission, can transmit high speed and high driving torque in a safe and positive way, and ensures smooth and positive engagement of the coupling members thereby protecting the rotating machine units as well as the coupling against damages.

Since the arrangement according to the present invention is such that, as above described, the first shaft which is on one of the driving sides and the second shaft on the other driving side are connected or disconnected by means of the claw coupling, the two shafts are coupled completely mechanically as the claw coupling is engaged. Accordingly, high-speed high-torque power transmission can be accomplished safely and positively without loss of the power being transmitted.

Further, as above described, the arrangement according to the invention comprises synchronizing shafts which are driven by the first shaft and which rotationally drive the second shaft by way of a friction clutch up to a speed close to that of the first shaft, so that the first and second shafts can be coupled by the claw coupling when the running speeds of the two shafts are made almost equal by means of the synchronizing shafts and the friction clutch. Therefore, in the early stage of power transmission, the friction clutch works gradually so as to transmit the power from the first shaft through the synchronizing shafts to the second shaft without imparting any shock, whereby the rotary machine units can be protected against any adverse effects. In addition, when the friction clutch is in the completely connected state, a moderate relative speed difference is produced which is most suitable for the engagement of the claw coupling, and hence the claw coupling is engaged smoothly and positively by dint of the moderate phase difference.

Figure 2:
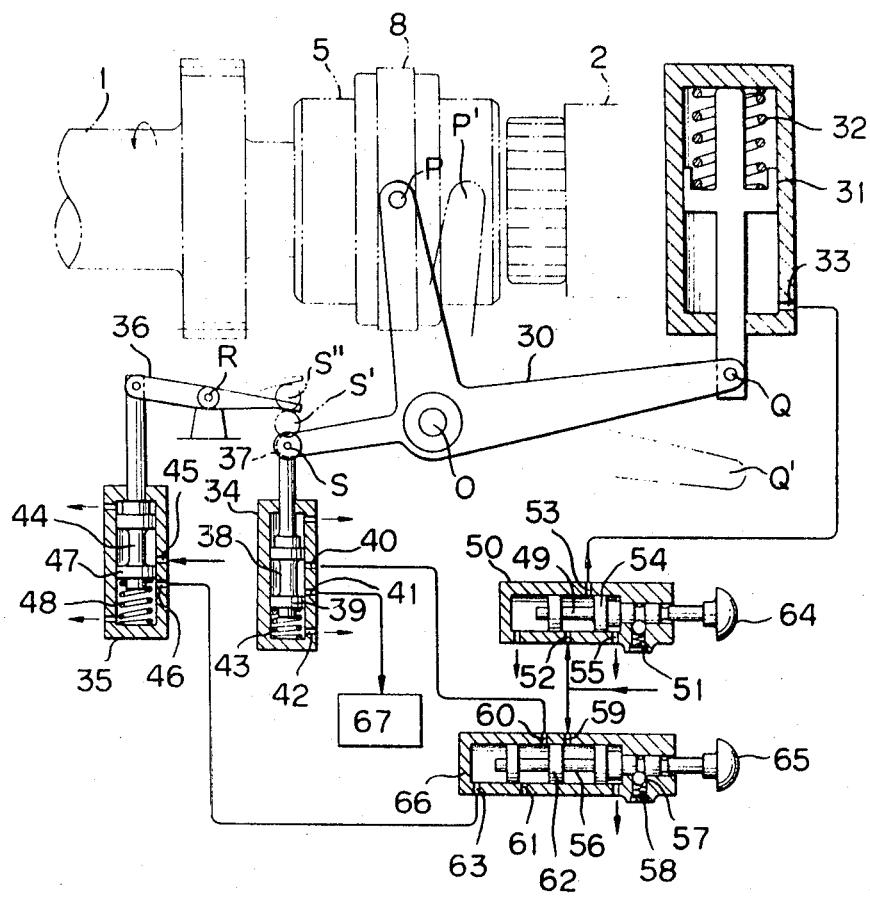

The invention will now be described in more detail with reference to the accompanying drawings showing an embodiment thereof. In the drawing:

FIG. 1 is a vertical sectional view, partly in section, of an embodiment of the invention; and FIG. 2 is a vertical sectional view, partly in section, of a control mechanism for the embodiment shown in FIG. 1.

In the drawing reference numeral 1 indicates a first shaft and 2 indicates a second shaft. The first shaft 1 and the second shaft 2 are provided, respectively, with teeth 3 and 4 of a claw coupling. On the first shaft 1 is loosely fitted an interlocking sleeve 5 which is provided with teeth 6 normally in mesh with the teeth 3 and is also provided with teeth 7 which is engaged with or disengaged from the teeth 4.

Indicated at 8 is a ring fitted onto the interlocking sleeve 5. Also indicated at 13 and 14 are synchronizing shafts. The synchronizing shaft 13 is coupled to the first shaft 1 by means of toothed wheels 9 and 11, while the synchronizing shaft 14 is coupled to the second shaft 2 by means of toothed wheels 10 and 12. The numbers of teeth on the toothed wheels 9, 10, 11 and 12 must be so chosen that a predetermined difference of speed of rotation can be obtained by the second shaft 2 with respect to the first shaft 1 when the claw coupling to be described later is in engagement.

Numeral 15 indicates a friction clutch box provided with a cover plate 16 and which is mounted on the synchronizing shaft 13. The box 15 contains a plurality of friction discs 17 which are supported by grooves 19 provided in the axial direction. The synchronizing shaft 14 is provided with a plurality of friction discs 18 which are supported by grooves 19 provided in the axial direction. 21 is a piston equipped with an airtight ring 22 and which slides in the box 15. 23 is a pressure chamber, 25 is an airtight sliding ring fitted on one end of the synchronizing shaft 13, and 26 is a passage of compressed air provided in the ring 25. A gas fed from an external source into a hole 29 is led through passages 26, 27, 28 and 24 into the pressure chamber 23.

A three-forked lever 30 is provided which is fitted at one end to the ring 8 and at another end to the rod of a piston 31, and the third end is provided with a roller 37. The lever is normally urged toward the position of dotted broken line by a spring 32 coiled around the rod of the piston 31.

Beneath the roller 37 is positioned the pilot 38 of a pilot valve 34 which is provided with an inlet port 40 for operating fluid, outlet port 41 for delivering the fluid to a relay 67, and a drain port 42. The pilot 38 is equipped with a collar 39 and is normally urged against the roller 37 by a spring 43.

Another pilot valve is indicated at 35, which is equipped with a pilot 44 having a collar 47. It is provided with an inlet port 45 for operating fluid, an outlet port 46 and a drain port. On top of the pilot 44 is pivotally connected an end of a center-pivoted lever 36 which rocks around a fulcrum for rocking R. The free end of the lever is positioned above the roller 37, and is urged normally toward the position indicated by a full line by the force of spring 48.

50 is a pilot valve equipped with an engageable pilot 49 having a collar 54. The valve is provided with ports 52 and 53 and a drain port 55. The engageable pilot 49 can be selectively positioned in either of two positions by means of a push button 64 and a detent 51.

66 is a synchronizing pilot valve equipped with a synchronizing pilot 56 having a collar 62. The valve is provided with an inlet port 59 for operating fluid, ports 60 and 63 and a drain port 61. The synchronizing pilot 56 can be selectively positioned in either of two positions by means of a push button 65 and detents 57 and 58.

Now the operation of the arrangement shown for connection and disconnection of rotary shafts will be described.

When the first shaft 1 and the second shaft 2 are to be coupled together, first the synchronizing button 65 is pressed in the state where the speeds of rotation of the two shafts are almost equal. Thereupon the synchronizing pilot 56 moves leftwardly as seen in the drawing, accompanied by the same movement by the collar 62. Thus, the hydraulic operation fluid being constantly fed through the inlet port 59 is communicated to the port 60, led through the ports 40 and 41 of the pilot valve 34 and thus actuates the relay 67, which in turn supplies a pressure gas to the friction clutch. Accordingly, the piston 21 compresses the friction discs 17 and 18 altogether, with the results that the synchronizing shafts 13 and 14 are thereby forcibly synchronized and the first shaft 1 and the second shaft 2 are temporarily coupled together through the friction clutch. At this time, there is provided a desired difference of relative speeds of revolution (five revolutions per minute) between the first shaft 1 and the second shaft 2 by means of the toothed wheels 9, 11, 12 and 10, and thus the engaging teeth 4 and 7 will face each other with the same difference of running speeds. If it is assumed that the numbers of teeth on the toothed wheels 9 and 11 are 69 and 76, respectively, that the numbers of teeth on the toothed wheels 10 and 12 are 68 and 75, respectively, and that the first shaft 1 is driven at a speed of 3600 r.p.m., then the speed of revolution of the second shaft 2 while the synchronizing shafts 13 and 14 in synchronized state are running at equal speeds will be $$3600 \text{ r.p.m.} \times \frac{76}{69} \times \frac{68}{75} = 3604.9 \text{ r.p.m.}$$

and this means that a moderate phase lag of about 5 r.p.m. develops between the engaging teeth 4 and 7 relative to each other.

Next, the push button 64 for engagement or disengagement is pressed. This moves the collar 54 of the engageable pilot 49 leftwardly. Accordingly, the port 53 is insulated from the inlet port 52 for the operating fluid but is communicated to the drain port 55, whereby the fluid below the piston 31 is drained and the piston 31 is forced upward by the spring 32. This causes the engaging sleeve 5 to move rightward thereby to bring the right sides of the engaging teeth 7 into contact with the left sides of the engaging teeth 4. The opposing teeth slide with respect to each other with a difference of relative speed difference of about 5 r.p.m. and are completely engaged with each other soon, or the moment when the phases of the opposing engaging teeth 4 and 7 have been matched.

When the first shaft 1 and the second shaft 2 have been completely connected by the claw coupling in the manner as described, the lever 30 then moves clockwise around the point O, accordingly shifting in position from the point P to P', from the point Q to Q', and from the point S to S'. As the lever 30 is displaced, the pilots 38 and 44 are actuated. The pilot 38 is moved upward by the spring 43 as the roller 37 rises, and, in the stroke from the point S to point S', specifically at the point S' which corresponds to the position where the engageable teeth 4 and 7 are brought into slight engagement with each other, it closes the outlet port 41 to the relay 67 and the inlet port 40 and at the same time communicates the outlet port 41 to the drain port 42, thus providing no more hydraulic signal to the relay 67. Consequently, supply of the pressure gas to the friction clutch is shut off, and the clutch is made inoperative. Moreover, because at the same time the pilot 44 is urged down through the lever 36 by the roller 37 in the final stroke of the lever 30 toward the point S', the inlet port 45 in which the operating fluid is constantly fed is communicated to the port 46. The port 63 of the synchronizing pilot valve 66 is then supplied with the operating fluid and moves the synchronizing pilot 56 rightward thereby to lock the same. By this action, the pilot 56 is kept out of operation as long as the claw coupling is in engagement, and hence the friction clutch is kept inoperative.

If a running prime mover is to be disconnected from the unit coupled thereto, it is only necessary to pull back the push button 64 which is provided for the connection and disconnection purposes. As you pull the push button 64 to the original position, the pilot 49 is displaced to the position shown thereby communicating the port 52 with the port 63, and the operating fluid is fed through the ports 52 and 53 to the portion below the piston 31, thereby pushing up the piston 31. As the result, the lever 30 is turned counter-clockwise, the engageable sleeve 5 is moved toward the disconnecting side, and the pilot 44 forced upward by the spring 18 depending upon the movement of the lever 30, while the pilot 38 is urged downward by the roller 37. As the pilot 44 ascends, the hydraulic pressure upon the left side of the synchronizing pilot 66 is eliminated and the synchronizing pilot 56 is unlocked. Conversely when the pilot 38 descends, the port 41 is communicated to the port 40, whereupon the synchronizing device can be reset to the operable condition all over again.

While the present invention has been described in connection with an embodiment thereof, it should not be construed of course that the present invention is not restricted thereto but numerous modifications in design are possible without departing from the spirit and scope of the invention.

What is claimed is:

1. An apparatus for synchronizing a first and second shaft to permit them to be coupled together while said first shaft is rotating, comprising a first coupling having an interengaging element adapted to be carried by said first shaft, a second coupling having an interengaging element adapted to be carried by said second shaft, means for interengaging the interengaging element of said first and second couplings, a first synchronizing shaft adapted to be driven by said first shaft, a second synchronizing shaft adjacent said first synchronizing shaft and adapted to drive said second shaft, gear means for interconnecting said first synchronizing shaft to said first shaft and said second synchronizing shaft to said second shaft for driving said second shaft at a speed slightly different from the rotation of said first shaft, a driving clutch member on said first synchronizing shaft, a driven clutch member on said second said synchronizing shaft engageable with said driving clutch member for rotating said second synchronizing shaft at the same speed as said first synchronizing shaft, means for engaging said driving and driven clutch members to drive said second synchronizing shaft and therefore said second shaft with said first shaft, said driving clutch member and said driven clutch member comprising interengageable plate members, said means for engaging said driving and driven clutch members comprising a cylinder, and a piston member slidable in said cylinder to frictionally engage said plate member.

2. An apparatus for synchronizing a first and second shaft to permit them to be coupled together while said first shaft is rotating, comprising a first coupling having an interengaging element adapted to be carried by said first shaft, a second coupling having an interengaging element adapted to be carried by said second shaft, means for interengaging the interengaging element of said first and second couplings, a first synchronizing shaft adapted to be driven by said first shaft, a second synchronizing shaft adjacent said first synchronizing shaft and adapted to drive said second shaft, gear means for interconnecting said first synchronizing shaft to said first shaft and said second synchronizing shaft to said second shaft for driving said second shaft at a speed slightly different from the rotation of said first shaft, a driving clutch member on said first synchronizing shaft, a driven clutch member on said second said synchronizing shaft engageable with said driving clutch member for rotating said second synchronizing shaft at the same speed as said first synchronizing shaft, means for engaging said driving and driven clutch members to drive said second synchronizing shaft and therefore said second shaft with said first shaft, said first coupling interengaging element comprising a plurality of teeth on said first shaft, said second coupling interengaging element comprising a plurality of teeth on said second shaft, said means for interengaging the interengaging elements comprising a sleeve member having a plurality of teeth which engage between the teeth of said first and second shafts for driving said shafts together, including a collar around said sleeve member, a lever connected to said collar, spring means urging said lever in a direction to cause engagement of said collar with said teeth of said first and second shaft and fluid pressure means movable against said spring means to urge said lever to move said collar to disengage said coupling.

3. Apparatus according to claim 2, including pilot valve means for regulating fluid pressure acting on said lever, said pilot valve means including a pilot which is displaceable to a direct fluid pressure against said lever to disengage said coupling and to release fluid pressure from said lever to permit engagement of said coupling.

4. Apparatus according to claim 2, including means responsive to movement of said lever to engage and disengage said driving and driven clutch members.

5. Apparatus according to claim 4, wherein said responsive means is effective to disengage said clutch driven and driving members when said lever is moved to a position at which said coupling is engaged.

References Cited

UNITED STATES PATENTS

| | | | |
|---|---|---|---|
| 1,984,618 | 12/1934 | Wirrer et al. | 192—53.2 |
| 2,943,719 | 7/1960 | McNamara | 74—339 |
| 3,182,778 | 5/1965 | Droschel. | |

LEONARD H. GERIN, Primary Examiner